Osborn & Crandell,
Boot Jack, Nut-Cracker, &c.

Nº 54,008. Patented Apr. 17, 1866.

Witnesses:

Inventor:
Geo. R. Osborn
Jno. Crandell
Per Munn & Co.
Attorneys

UNITED STATES PATENT OFFICE.

GEORGE R. OSBORN AND JOHN CRANDELL, OF ILION, NEW YORK.

IMPROVED BOOT-JACK, NUT-CRACKER, TACK-HAMMER, AND TACK-PULLER.

Specification forming part of Letters Patent No. 54,008, dated April 17, 1866.

*To all whom it may concern:*

Be it known that we, GEORGE R. OSBORN and JOHN CRANDELL, of Ilion, in the county of Herkimer and State of New York, have invented a new and Combined Boot-Jack, Nut-Cracker, Tack-Hammer, and Tack-Puller; and we do hereby declare that the following is a full, clear, and exact description thereof, which will enable others skilled in the art to make and use the same, reference being had to the accompanying drawings, forming a part of this specification, in which—

Figure 1:
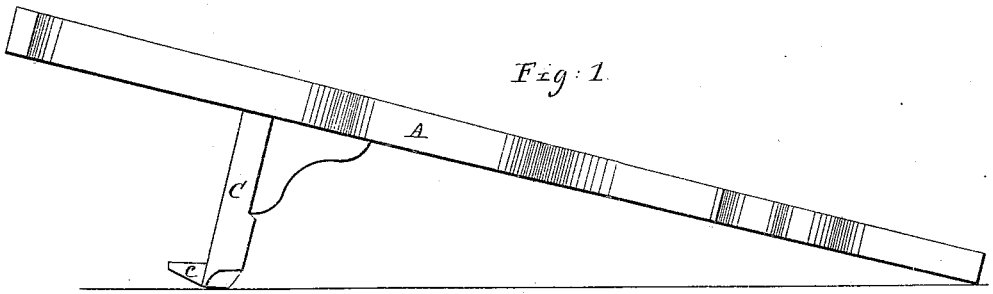
Figure 2:
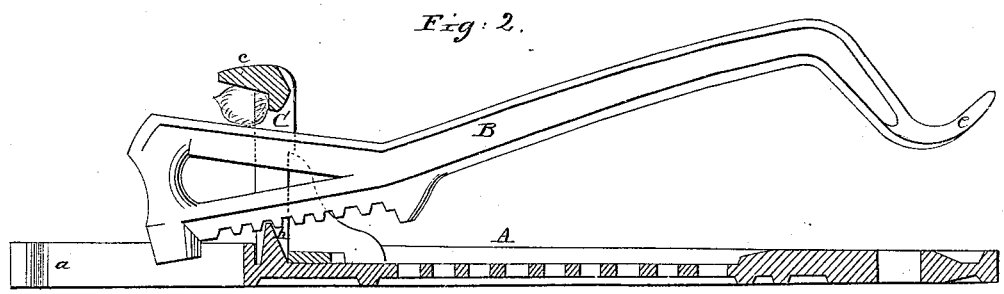
Figure 3:
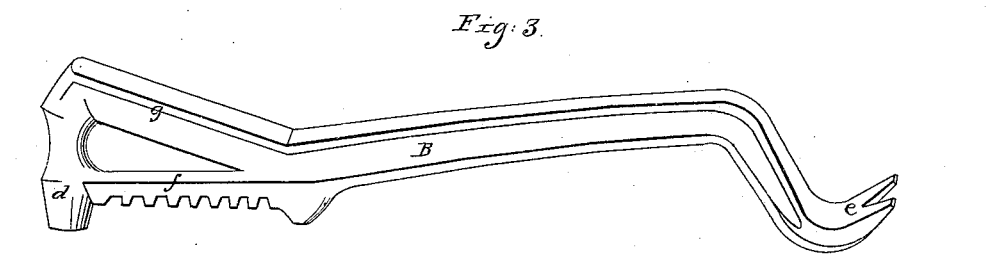

Figure 1 is a side elevation of the device when in position for use as a boot-jack. Fig. 2 is also a side elevation, partly in section, when in position for use as a nut-cracker. Fig. 3 is a view of one part of the device detached from the other, which part may be used as a tack-hammer and a tack-puller.

Similar letters of reference indicate like parts.

Our invention consists, for the purpose of accomplishing the combination above specified, of two pieces of metal, which together will perform all the offices specified. The whole device is composed of two separate pieces of metal designated by the letters A B. The part A is bifurcated at one end, so as to form prongs $a$, between which the heel of the boot, when it is desired to withdraw the foot from the same, is placed, the other foot the meanwhile resting on A, as is usual.

C is the leg projecting from the under side of the device, and intended for elevating one end of the part A, as is ordinary with boot-jacks; but this leg has a projection or flange, $c$, on its outer end, against which the nut is placed for cracking the same when the part A is reversed, as will be presently described.

The part B is so constructed as to answer the purpose of a tack-hammer, $d$, which is at one end of the bar, and a claw or tack-puller, $e$, at the other end.

The bar is divided at one end into two parts, $f g$, both being connected to the hammer. The under side of the part $f$ is notched, and the upper part is inclined from the end downward.

In using the device as a nut-cracker the bar is inserted through a slot in the leg C, so that the desired notch on the part $f$ will rest upon a support or cross-piece, $h$, and thus be effectually prevented from slipping. The nut is placed in the proper position, so that it will bear against the flange $c$ and against the inclined plane of the bar B when the other end of the bar is somewhat raised, as shown clearly in Fig. 2. Now, by depressing the bar B, which acts as a lever, its fulcrum being on the cross-piece $e$, it will press the nut sufficiently hard up against the flange $c$ to crack it.

It will therefore be seen that in one simple device, consisting of but two pieces, we combine a boot-jack, a nut-cracker, a tack-hammer, and a tack-puller, the device being portable and cheap in construction.

We do not limit our combination to the positive employment or construction of the tack-puller and the hammer, for without them a combined boot-jack and nut-cracker would be produced.

What we claim as new, and desire to secure by Letters Patent, is—

1. A boot-jack, nut-cracker, tack-hammer, and tack-puller combined, substantially as specified.

2. A combined boot-jack and nut-cracker, substantially as specified.

3. The adjustability of the bar or lever B upon its fulcrum $h$ to suit different-sized nuts, substantially as specified.

GEORGE R. OSBORN.
JOHN CRANDELL.

Witnesses:
W. H. THOMAS,
G. W. BAXTER.